United States Patent
van der Lely et al.

[11] 3,930,542
[45] Jan. 6, 1976

[54] ROTARY HARROWS

[76] Inventors: Ary van der Lely, 10, Weverskade; Cornelis Johannes Gerardus Bom, 36, Esdoornlaan, both of Maasland, Netherlands

[22] Filed: June 5, 1974

[21] Appl. No.: 476,550

Related U.S. Application Data

[62] Division of Ser. No. 283,338, Aug. 24, 1972, Pat. No. 3,821,989.

[30] Foreign Application Priority Data

Aug. 31, 1971 Netherlands.................... 7111947

[52] U.S. Cl. ................ 172/59; 172/767; 172/610; 172/112
[51] Int. Cl.²................... A01B 33/06; A01B 33/16
[58] Field of Search ............ 172/59, 111, 776, 763, 172/439, 451, 49, 794, 610, 112, 113

[56] References Cited
UNITED STATES PATENTS

| 230,068 | 7/1880 | Saurer | 172/610 |
|---|---|---|---|
| 2,034,780 | 3/1936 | Storey | 172/49 |
| 2,277,304 | 3/1942 | Cihak | 172/610 |
| 2,582,364 | 1/1952 | Tice | 172/49 |
| 3,371,721 | 3/1968 | Mathis | 172/112 |
| 3,821,989 | 7/1974 | van der Lely et al | 172/59 |
| 3,841,411 | 10/1974 | van der Lely et al | 172/59 |

*Primary Examiner*—George J. Marlo
*Attorney, Agent, or Firm*—Mason, Mason & Albright

[57] ABSTRACT

A cultivator has an elongated frame and a plurality of rotary soil working members mounted side-by-side in a row that extends transverse to the direction of travel. The soil working members have depending tines that rotate about upwardly extending shafts which are connected to horizontal supports for the tines. A screening element extends along the front of the frame and is displaceable relative to the frame via a pivoted arm and spring arrangement that biases the element to a position closely adjacent to the connections between the tines and their supports. The elements are connected to arms that are jack-knifed and pivoted to turn about an axis located above the frame. A rotary soil compressing member may be attached to the rear of the frame.

7 Claims, 3 Drawing Figures

ROTARY HARROWS

This application is a divisional application of Ser. No. 283,338 filed Aug. 24, 1972, now U.S. Pat. No. 3,821,989 and related to Ser. No. 208,687 filed Dec. 16, 1971.

Figure 1:
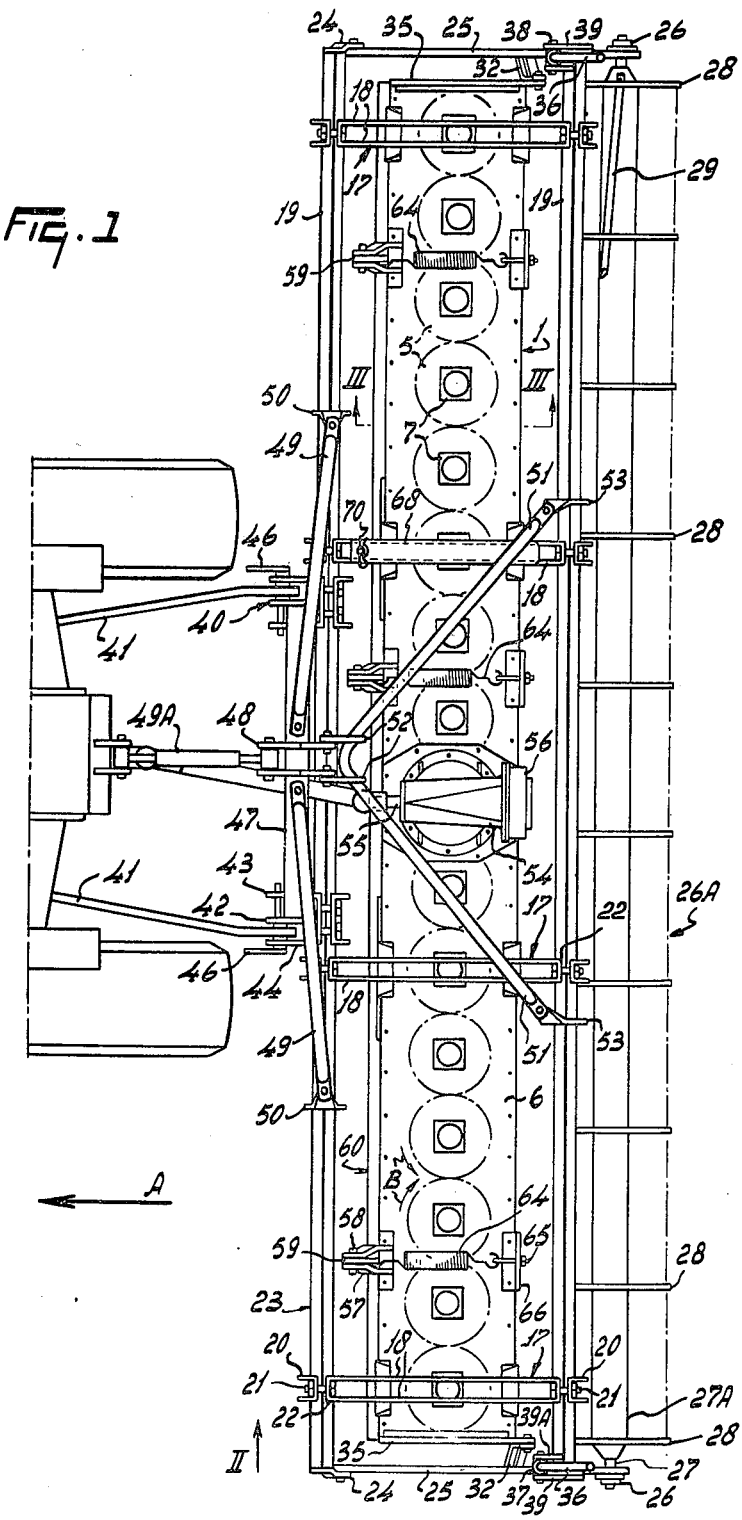
Figure 2:
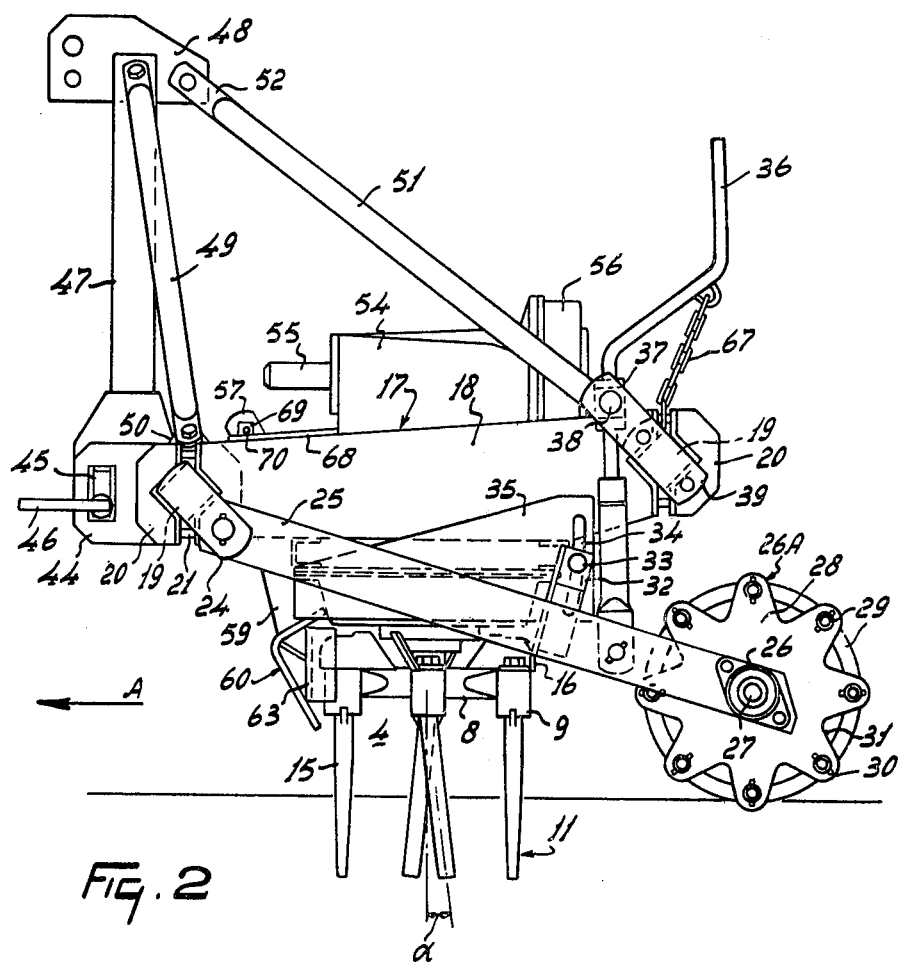
Figure 3:
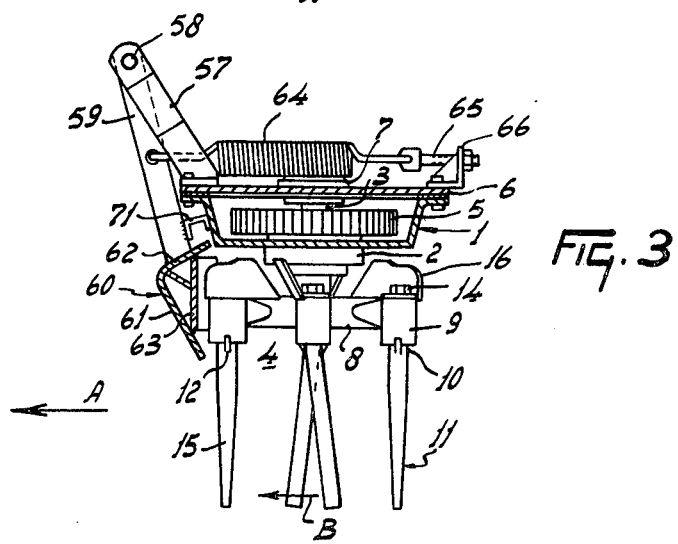

FIG. 1 is a plan view of a cultivating implement or rotary harrow in accordance with the invention mounted at the rear of an agricultural tractor, FIG. 2 is a side elevation, to an enlarged scale, as seen in the direction indicated by an arrow II in FIG. 1, and, FIG. 3 is a section, to an enlarged scale, taken on the line III—III of FIG. 1.

Referring to the drawings, the soil cultivating implement or rotary harrow includes a main frame part 1 of hollow box-like configuration that extends substantially horizontally perpendicular to the intended direction of operative travel of the harrow which is indicated by an arrow A in each Figure of the drawings. The bottom of the main frame part 1 is provided with a plurality of regularly spaced apart substantially vertical bearings 2 of which there are 16. Each bearing 2 receives a corresponding substantially vertical rotary shaft 3 which is provided, at its lower end, with a corresponding soil working member that is generally indicated by the reference 4. The rotary shafts are arranged in a single row that extends substantially perpendicular to the direction A and it is preferred that the axis of rotation of each shaft 3 should be spaced from that of its neighbor, or each of its neighbors, by a distance of substantially 25 centimeters.

Each shaft 3 is provided, inside the hollow main frame part 1, with a corresponding spur-toothed pinion 5, the 16 pinions 5 being arranged in inter-meshing engagement in the manner which can be seen in outline in FIG. 1 of the drawings. A substantially horizontal plate 6 affords the top of the main frame part 1 and is releasably secured to the remainder of said part 1 by bolts with the provision of an intervening gasket so as substantially completely to close off the interior of said part 1 and prevent contamination of the lubricant contained therein by external dirt. The plate 6 is provided with sixteen substantially vertical bearings 7 that are mounted in openings in the plate in substantially vertical alignment with corresponding bearings 2. The upper ends of the sixteen shafts 3 are rotatably received in the bearings 7. Each soil working member 4 comprises a corresponding substantially horizontal support 8 secured centrally to the lowermost end of the corresponding shaft 3 that projects from beneath the corresponding bearing 2. the opposite ends of each support 8 carry substantially vertical tine holders 9 whose axes extend parallel to the axes of rotation of the shafts 3. Each holder 9 receives an upper fastening portion 10 of a corresponding rigid tine 11. In order to prevent the tines 11 from turning in their holders 9, the fastening portions 10 thereof are provided with at least one laterally projecting lug or rib 12 that is lodged in a corresponding groove or recess at the foot of the tine holder 9 concerned. The upper end of the fastening portion 10 of each tine 11 is screw-threaded and receives a nut 14 by which the tine can be clamped securely, but releasably, in its holder 9. It is preferred that the nuts 14 whould incorporate nylon or other thread-gripping inserts designed to prevent them from being worked loose by vibration during the use of the harrow.

In addition to its fastening portion 10, each tine 11 has a lower straight soil working portion 15 which is inclined upwardly and forwardly from its lowermost free end or tip to its junction with the fastening portion 10 with respect to the intended direction of rotation of the soil working member 4 concerned which is indicated by an arrow B in FIG. 3 of the drawings and also by further arrows B in FIG. 1. The soil working portions 15 normally trail somewhat with respect to the direction B but the form of co-operation between the soil working portions 10 and the holders 9 is preferably such that each tine 11 can be turned through 180° in its holder 9 and be resecured in an alternative position in which its soil working portion 15 leads, rather than trails, with respect to the direction B. The angular junctions between the fastening portions 10 and soil working portions 15 of the tines 11 are all of equal magnitude and are preferably such that an angle of substantially 8° is enclosed between the longitudinal axes of the two portions of each tine (FIG. 2).

A plate 16 is provided at the top of each tine holder 9 and is inclined to the vertical in an upward and forward direction with respect to the intended direction of rotation B. The plates 16 which are slightly bent shield the tine fastening nuts 14 from being struck by sharp flying stones and the like during the operation of the harrow and their disposition is such that any stone or the like which strikes the leading surface of one of them is urged in a generally downward direction towards the ground surface. Four supports 17 that extend substantially parallel to the direction A are provided on top of the main frame part 1 at equal distances apart from one another across the width of the harrow with the central pair of the two supports spaced at opposite lateral sides from the midpoint of the main frame part 1. Each support 17 includes two vertically disposed and laterally spaced plates 18 that are formed at both their leading and rear ends, with respect to the direction A, with angular recesses in which fit matchingly profiled beams 19 of angular cross-section. The two beams 19 both extend substantially horizontally perpendicular to the direction A. Transverse members 22 of angular cross-section extend between the recesses in the plates 18 at the front and at the rear of those plates and the detachable beams 19 are urged into the recesses and against the transverse members 22 by clamps 20 that are retained in their clamping positions by bolts 21. Each beam 19 is parallel to a substantially horizontal line that interconnects the axes of rotation of all of the shafts 3 and has a length in a horizontal direction perpendicular to the direction A which is as great as the total working width of the harrow.

The beams 19 and supports 17 form a supporting structure 23 and leading beams 19 have lugs 24 connected by horizontal pivot pins. The pins define an axis extending substantially perpendicular to the direction A to the leading ends of corresponding arms 25 that are inclined downwardly from the lugs 24 and rearwardly with respect to the direction A. The rearmost end of each arm 25 carries a horizontal bearing 26 and the two bearings 26 receive stub shafts 27 at the opposite ends of a rotary soil compressing member in the form of a roller 26A. The stub shafts 27 project from the opposite ends of a central tube 27A of the roller 26A, said tube 27A being provided at its opposite ends and at regular intervals along its length with a plurality, such as ten, of substantially vertically disposed plates 28 whose shapes can be seen best in FIG. 2 of the drawings. Each plate 28 has its plane disposed perpendicular to the axis of rotation defined by the two stub shafts 27.

The plates 28 are formed, adjacent their peripheries, with a plurality of holes, such as eight, through which elongated tubular elements 29 are entered, said elements 29 being retained against appreciable longitudinal displacement with respect to the plates 28 by quickly releasable transverse pins 30 but it will be noted that the holes in the plates 28 receive the elements 29 with some degree of play so that the elements 29 can turn in those holes. As can be seen in FIG. 2 of the drawings, each plate 28 is formed with generally V-shaped recesses 31 between the portions thereof that are formed with the holes receiving the elongated tubular elements 29.

Each of the two arms 25 carries a corresponding upwardly directed bracket 32 whose upper end carries a transverse bolt 33 that passes through an arcuate slot 34 in a substantially vertical plate 35 fastened to the corresponding end of the main frame part 1. The two bolts 33 are both provided with nuts and the arcuate slots 34 have their centers of curvature in register with the pivotal connections between the arms 25 and the lugs 24. The nuts and bolts 33 constitute locking devices for the level of the roller 26A relative to the remainder of the harrow in combination with the arcuate slots 34 in the plates 35. Immediately to the rear of each bracket 32, each arm 25 is connected by a corresponding horizontal pivot pin to the lowermost end of the housing of a screw-threaded cranked spindle 36 which has a plain portion of its shank rotatably but substantially axially immovably received in a block 37 that is turnably mounted by trunnion pins 38 between two supports 39 and 39A that project upwardly and forwardly with respect to the direction A from opposite end regions of the rearmost of the two beams 19 of the supporting structure 23.

The front of the leading beam 19 of the supporting structure 23 is provided with coupling means 40 intended for connection to the lower lifting links 41 of a three-point lifting device or hitch at the rear of an agricultural tractor of other operating vehicle. The coupling means 40 include vertical plates 42 flanked on opposite sides by further vertical plates 43 and 44. Each of the plates 42, 43 and 44 is formed with a substantially vertically extending slot 45 and horizontal pins 46 can be retained in positions in which they extend through the respective sets of slots 45 to establish the necessary pivotal connections with the lifting links 41. The plates 42, 43 and 44 are mounted at the foot of a generally triangular coupling member or tripod 47 whose apex carries coupling means 48 in the form of a pair of vertically disposed but horizontally spaced apart plates formed with holes of different sizes to receive a transverse pin establishing a pivotal connection with the adjustable upper lifting link 49A of the three-point lifting device or hitch.

The coupling member or tripod 47 is of the previously mentioned conventional generally triangular shape and its apex is connected by tie rods 49 with brackets 50 fastened to the leading one of the two beams 19 with respect to the direction A. A further generally V-shaped strengthening support 51 is arranged between lugs 52 that project rearwardly from the coupling means 48 and brackets 53 secured to the rearmost beam 19 of the supporting structure 23 with respect to the direction A, the generally V-shaped support 51 being entered through openings in the lugs 52 at locations adjacent the point of the V. The coupling member or tripod 47, the tie rods 49 and the strengthening support 51 are all mounted in their operative positions with the aid of nuts and bolts.

The shaft 3 of one of the central pair of soil working members 4 of the single row of 16 such members has an upward extension, beyond the corresponding bearing 7, into a gear box 54. The shaft extension, which is not visible in the drawings, is in driven connection with a forwardly projecting splined or otherwise keyed rotary input shaft 55 by way of a change-speed gear assembly 56 that is mounted at the rear of the gear box 54 with respect to the direction A.

Pairs of lugs 57 which are inclined upwardly and forwardly with respect to the direction A are provided at the front of the main frame part 1, said pairs of lugs 57 being spaced inwardly from the opposite ends of the main frame part 1 by distances which are preferably equal to the working widths of two of the soil working members 4. Each pair of lugs 57 has a corresponding arm 59 pivotally connected to its leading upper end by a pin 58 that lies above the frame part 1 and extends substantially horizontally perpendicular to the direction A. The arms 59 extend generally downwards from the pins 58 and their lower ends have a single screening element 60 welded or otherwise rigidly secured to them. The screening element 60 extends substantially horizontally perpendicular to the direction A and its lowermost edge is located at a horizontal level below that of the bottoms of the tine holders 9. The element 60 is of angular cross-section and includes a lower portion 61 that extends upwardly and forwardly with respect to the direction A from its lower edge, said portion 61 merging by way of a bend of substantially 90° into an upper portion 62 that is inclined upwardly and rearwardly with respect to the direction A away from said bend towards its upper edge. A substantially vertically disposed strip 63 interconnects the rear surfaces of the two portions 61 and 62 of the screening element 60 and has its opposite lateral ends bent over rearwardly in the manner which can be seen in FIGS. 2 and 3 of the drawings. Helical tension springs 64 have their leading ends connected to the arms 59 at locations approximately midway between the pivot pins 58 and the screening element 60 to which both arms are secured. The springs 64 are disposed above the main frame part 1 so as to extend substantially parallel to the direction A and their rearmost ends are connected by hooks to adjusters 65 having nuts which bear against brackets 66 bolted to the top and rear of the main frame part 1. It will be evident from FIGS. 1 and 3 of the drawings that the nuts forming parts of the adjusters 65 can be tightened or loosened to increase or decrease the degree of tension of the corresponding springs 64.

The screening element 60 which is arranged in front of the soil working members 4 with respect to the direction A and which has the front surface of its lower portion 61 inclined downwardly and rearwardly with respect to said direction shields the bottom of the main frame part 1, the bearings 2, the supports 8 and the tine holders 9 from encountering any large stones which the tines 15 may meet during their passage through the soil so that damage from this cause is reduced to a minimum. The screening element 60 is pivotable about the axis defined by the pins 58 in a clockwise direction as seen in FIGS. 2 and 3 of the drawings against the action of the strong tension springs 64. Thus, should any smaller stones find their way between the tops of the soil working members 4 and the screening elemment 60, said screening element can deflect forwardly, without damage, until the obstacle has been pushed away whereupon the element 60 will snap back into the illustrated position in which its supporting arms 59 bear against stops 71 (FIG. 3) carried at the front of the main frame part 1.

We claim:

1. A cultivator having an elongated frame and a plurality of rotatable soil working members mounted side-by-side in a transverse row, said soil working members being rotatable about upwardly extending shafts and comprising substantially horizontally extending supports having downwardly extending tines, driving means being in driving engagement with said shafts to rotate said members during operation, screening means pivotably connected to said cultivator and extending horizontally along the front of said frame relative to the direction of travel, a lower portion of said screening means being normally located directly in front of the connections of said tines to their corresponding supports, an upper portion of said screening means being pivotally connected to said elongated frame and displaceable about an axis located above said elongated frame, spring means being connected to bias said screening means to an operative protective position, whereby the front of said frame and the connections of said tines with their corresponding supports are protected from debris encountered during operation of the cultivator.

2. A cultivator as claimed in claim 1 wherein said screening means is connected to said frame through upwardly extending arms and said arms being pivotally interconnected with said frame by support means on said frame.

3. A cultivator as claimed in claim 2 wherein said support means extends upwardly and forwardly and pivots connect said support means and said arms.

4. A cultivator as claimed in claim 3 wherein at least one of said arms is connected to one end of a helical tension spring of said spring means which extends substantially parallel to the upperside of said frame.

5. A cultivator as claimed in claim 4 wherein said spring is connected to said arm at a point which is located between the ends of said arm.

6. A cultivator as claimed in claim 5 wherein said point is adjacent the center of said arm.

7. A cultivator as claimed in claim 4 wherein said spring is connected to a bracket support at the rear of said frame.

* * * * *